No. 661,532.  
A. G. HOHENSTEIN.  
STEAM BOILER.  
(Application filed Feb. 16, 1900.)

Patented Nov. 13, 1900.

(No Model.)  
4 Sheets—Sheet 1.

WITNESSES:  
Herbert Bradley  
A. E. Garthur

INVENTOR  
Archie G. Hohenstein  
by Daniel B. Wolcott Att'y.

No. 661,532. Patented Nov. 13, 1900.
A. G. HOHENSTEIN.
STEAM BOILER.
(Application filed Feb. 16, 1900.)

(No Model.) 4 Sheets—Sheet 2.

WITNESSES:
Herbert Bradley
P. E. Gaither

INVENTOR
Archie G. Hohenstein
by Darwin S. Wolcott Att'y

No. 661,532. Patented Nov. 13, 1900.
A. G. HOHENSTEIN.
STEAM BOILER.
(Application filed Feb. 16, 1900.)

(No Model.) 4 Sheets—Sheet 3.

WITNESSES: Herbert Bradley. F. E. Gaither.

INVENTOR.
Archie G. Hohenstein
by Samuel L. Wolcott
Att'y.

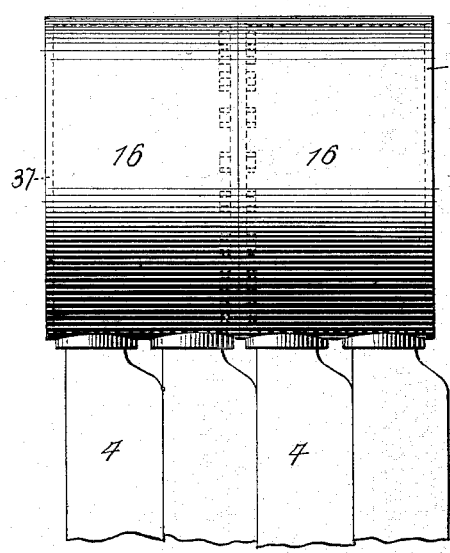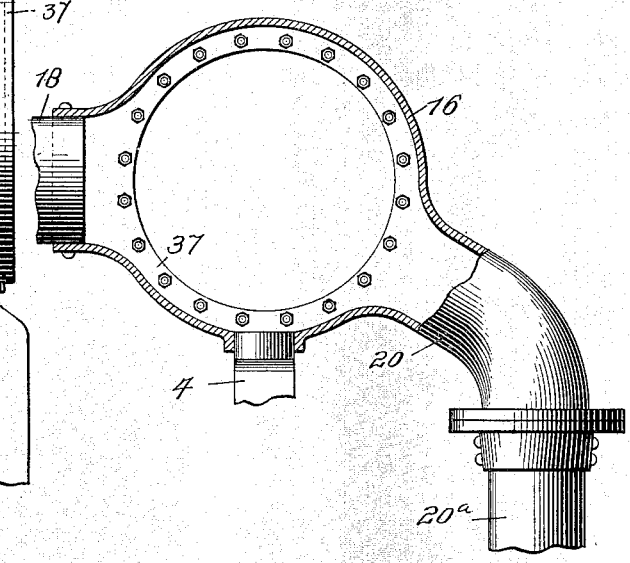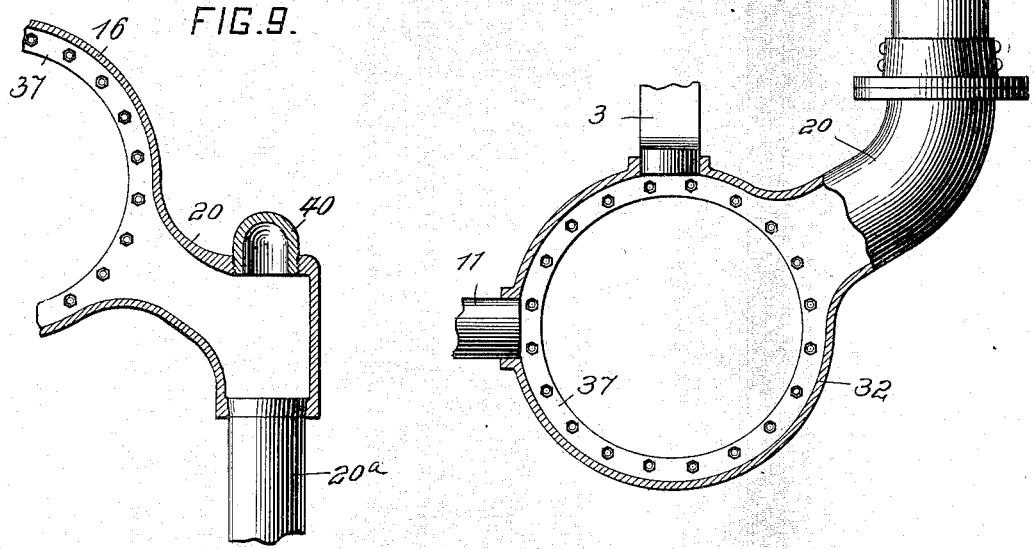

UNITED STATES PATENT OFFICE.

ARCHIE G. HOHENSTEIN, OF NEW HAVEN, CONNECTICUT.

STEAM-BOILER.

SPECIFICATION forming part of Letters Patent No. 661,532, dated November 13, 1900.

Application filed February 16, 1900. Serial No. 5,440. (No model.)

*To all whom it may concern:*

Be it known that I, ARCHIE G. HOHENSTEIN, a citizen of the United States, residing at New Haven, in the county of New Haven and State of Connecticut, have invented or discovered certain new and useful Improvements in Steam-Boilers, of which improvements the following is a specification.

The invention described herein relates to certain improvements in water-tube boilers, and has for its object a construction whereby the boiler of the type set forth in an application filed of even date herewith may be formed by one or more units, each unit consisting of parts or elements easily detachable from each other, thereby facilitating the manufacture, transfer, and erection of the boiler.

The invention is hereinafter more fully described and claimed.

Figure 1:
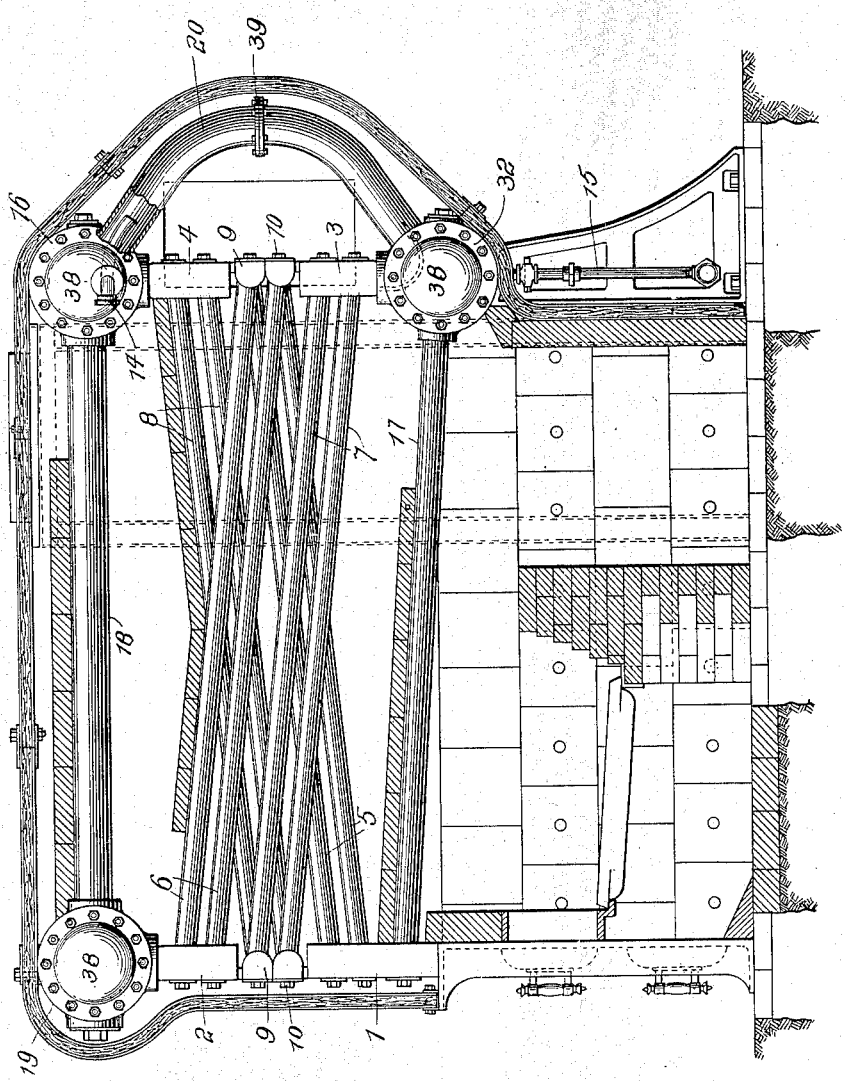
Figure 2:
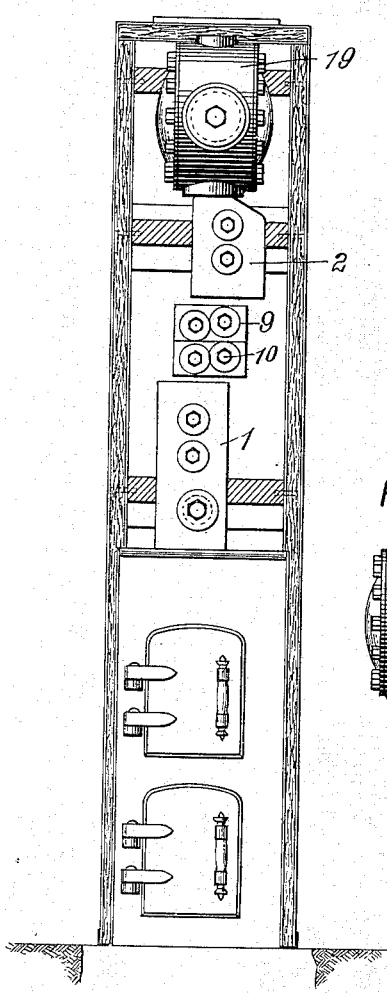
Figure 3:
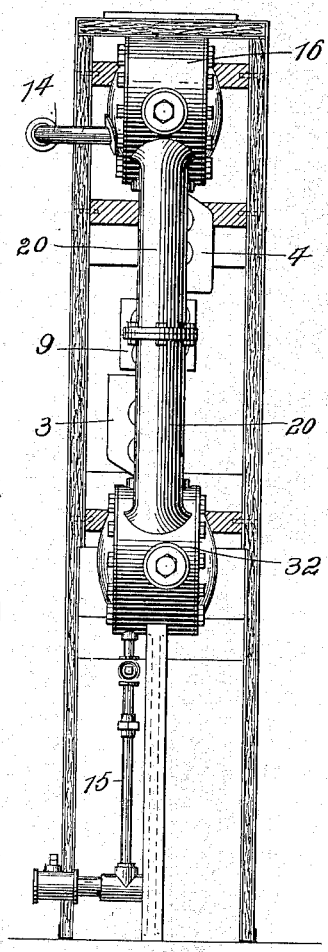
Figure 6:
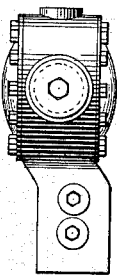
Figure 4:
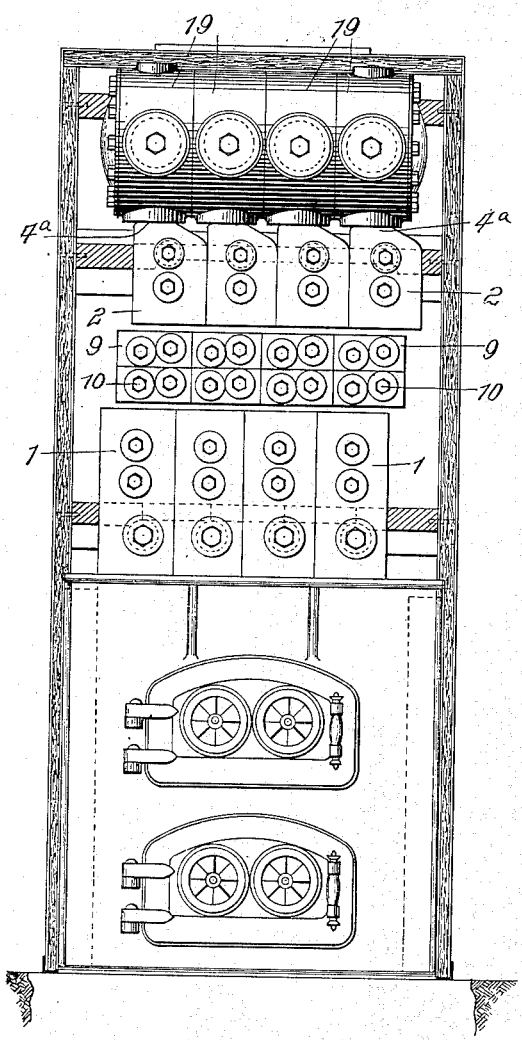
Figure 5:
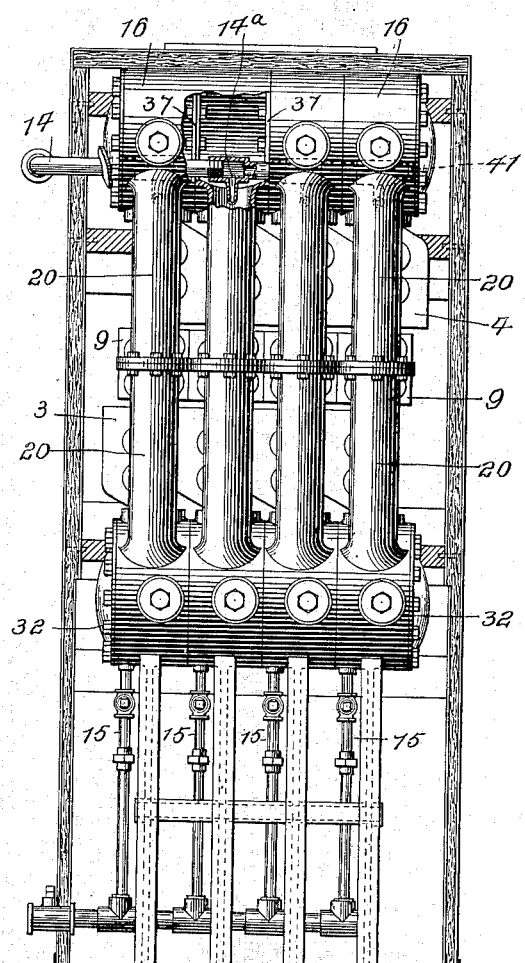

In the accompanying drawings, forming a part of this specification, Figure 1 is a side elevation of my improved boiler, the casing being removed. Figs. 2 and 3 are front and rear elevations, respectively, of a boiler formed of a single unit. Figs. 4 and 5 are similar views of a boiler formed of a series of units. Fig. 6 is a detail showing the front drum and upper front header formed integral with each other. Fig. 7 is a detail view illustrating a modification in the construction and arrangement of the front drum and headers. Figs. 8 and 9 are sectional detail views illustrating modifications in the construction and manner of connecting the downtakes to the rear drums.

In the practice of my invention the boiler is formed by a single unit or a series of two or more similar units arranged side by side. Each unit consists of one or more upper and lower front headers 1 and 2, one or more upper and lower rear headers 3 and 4, a front drum 19, two rear drums 16 and 32, tubes extending across the combustion-chamber and connecting the front and rear elements, and downtake-pipes 20, connecting the rear drums. The front headers 1 and 2 are connected by banks of tubes 5 and 6, extending, respectively, from said headers across the combustion-chamber to points between the rear headers, where the tubes of one bank are connected to those of the other bank by return-bends 9. The rear headers 3 and 4 are connected by banks of tubes 7 and 8, extending from the respective headers across the combustion-chamber to points between the front headers, where the tubes are connected in pairs by return-bends 9. The drum 32 is connected by a series of tubes 11 to the lower front header 1, said tubes being intermediate of the firebox and the banks of tubes connecting the headers. The lower drum 32 is made of a capacity greater than the combined carrying capacities of the tubes 11 and the lower rear header 3, connected with the upper portion of said drum, thereby affording opportunity for the settling of any solid matter out of the circulating currents to the lower side of the drum, from which said solid matter is removed by the blow-off pipe 15. The upper headers 2 and 4 are connected, respectively, to the drums 19 and 16, which are connected to each other by a tube 18. The drums 19 and 16 are made of a capacity at least fifty per cent. greater than the delivering capacity of the respective headers connected thereto, thereby affording ample steam-breaking area. In order to permit of the flow of steam from one upper drum to the other and incidentally affording additional steam-breaking area, the tube 18, connecting the drums 19 and 16, is made with a capacity in excess of the delivering capacity of either of the upper headers. These headers 2 and 4 and the lower rear header 3 are similar in construction and are therefore interchangeable.

As the tubes 11, 5, 6, 7, 8, and 18 form the main heating-surfaces, they should be arranged midway of the side walls of the combustion-chamber, and as it is desirable for structural reasons that the drums should be in the same vertical plane the arrangement of the banks of tubes in different vertical planes necessitates the offsetting of one or the other of the points of connection of the headers 2, 3, and 4 with the drums and banks of tubes. While either of these points of connection may be offset, it is preferred to offset the necks 4ᵃ of the headers, as shown in Figs. 2, 3, 4, and 5.

By reference to Figs. 2, 3, 4, and 5 it will be seen that by offsetting the connections of the headers to the drums all the parts or elements of the units are in parallel or substantially parallel vertical planes. The drums are provided at their ends with flanges 37, which preferably project inwardly in marine boilers, thereby removing the bolts from all flame or hot-gas exposure and also effecting a saving of the height of the space occupied by the boiler. In boilers formed of a single unit both ends of the drums are closed by heads 38, bolted to the flanges. The downtake-pipe 20 may be formed of two sections formed on or secured to the rear drums and having their ends connected together by flanges 39 or other suitable means.

As shown in Fig. 8, the section of the downtake-pipes secured to the drums may be connected by an intermediate section 20$^a$, the several sections being connected by flanges, or the intermediate sections 202 may be expanded into the ends of the drum-sections, as shown in Fig. 9, said drum being provided with openings closed by caps 40 for the insertion of the expanding-tool.

As shown in Fig. 7, each unit boiler may have the drums made of sufficient length to permit of two or more headers being connected thereto. In such case each unit would consist of three drums, eight or more headers and banks of cross-tubes, two or more tubes 11, one or more tubes 18, and one or more downtake-pipes.

As shown in Figs. 4 and 5, a series of two or more of these units may be connected to form a boiler of any desired capacity. The connection between the units is effected by bolting together the flanges 37 of adjacent drums and closing the ends of the outside drums by heads 38. This construction is particularly advantageous in places where repairs are made with difficulty and involve delay in obtaining new parts, as in case of repairs of any of the parts of one or more of the sections or units, and the making of such repairs would require considerable time, such unit or units could be entirely removed and the remaining units closed together and connected or cut out by blank-flanging the openings. Such removal and connection can be done in a very short time and involves the loss of only a portion of the power and not the closing down of the entire plant.

By employing units, which in and of themselves are complete boilers, the capacity of any boiler may be increased or diminished by simply adding or removing one or more units without disturbing any of the other units. As set forth in the application referred to, the feed-water pipe 14, which is connected to the upper rear drum, extends along in front of the downtake-pipes 20 and is preferably provided with nozzles projecting into the downtake-pipes. The sectional characteristics of my boiler are extended to the feed-pipe, the portion thereof within the drum being formed of a series of interchangeable sections 14$^a$, each provided with a nozzle 36$^a$, adapted to project into a downtake-pipe. The end section is closed by a cap 41.

It is characteristic of my improvement that each unit forms in and of itself a complete boiler structure which can be used alone, or a boiler of any desired capacity may be formed by connecting together any desired number of units, and, further, one or more units can be isolated or removed without interfering with the use of the remaining units. It is also characteristic of my improvement that the parts composing the unit are small and can therefore be easily shipped and erected at the place of use. No special tools are required, the ordinary expander and wrenches being the only tools necessary. This subdivision of the parts and the facility of erection are of especial advantage in marine boilers, as the parts can be passed through the usual hatchways, thereby avoiding the tearing up of decks when new boilers are required.

I claim herein as my invention—

1. A water-tube boiler consisting of a series of two or more detachable units, each unit consisting of water-chambers arranged on opposite sides of the combustion-chamber, a series of pairs of connected tubes, the members of each pair extending in diverging lines from one side of the boiler to the water-chambers on the opposite side, and a second series of pairs of connected tubes, the members of each pair extending from the other side of the boiler in diverging lines to the opposite water-chambers and return connections or downtakes, substantially as set forth.

2. A water-tube boiler, having in combination, three drums, each consisting of two or more connected sections, two of said drums being arranged in or approximately in the same horizontal plane above the other drum, two series of tubes extending from each section of the lower drum connected respectively to the corresponding sections of the upper drums, tubes connecting the sections of the upper drums and downtake-pipes connecting each section of one of the upper drums to a corresponding section of the lower drum, substantially as set forth.

3. A water-tube boiler, having in combination a drum, a header connected to the drum, a series of tubes connected to the header, the points of connection of the header to the tubes and drum being in different vertical planes, substantially as set forth.

In testimony whereof I have hereunto set my hand.

ARCHIE G. HOHENSTEIN.

Witnesses:
DARWIN S. WOLCOTT,
F. E. GAITHER.